US011846755B2

(12) United States Patent
Ahn et al.

(10) Patent No.: US 11,846,755 B2
(45) Date of Patent: Dec. 19, 2023

(54) HARD COATING FILM AND FLEXIBLE DISPLAY PANEL INCLUDING THE SAME

(71) Applicants: SK Innovation Co., Ltd., Seoul (KR); SK IE Technology Co., Ltd., Seoul (KR)

(72) Inventors: Jong Nam Ahn, Daejeon (KR); Byoung Sun Ko, Daejeon (KR); Jin Su Park, Daejeon (KR); Tae Sug Jang, Daejeon (KR); Keon Hyeok Ko, Daejeon (KR); Ho Chul Yoon, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 498 days.

(21) Appl. No.: 16/785,827

(22) Filed: Feb. 10, 2020

(65) Prior Publication Data

US 2020/0257023 A1  Aug. 13, 2020

(30) Foreign Application Priority Data

Feb. 11, 2019 (KR) ........................ 10-2019-0015554
Dec. 16, 2019 (KR) ........................ 10-2019-0167883

(51) Int. Cl.
*G02B 1/14* (2015.01)
*B32B 27/28* (2006.01)
(Continued)

(52) U.S. Cl.
CPC .............. *G02B 1/14* (2015.01); *B32B 27/281* (2013.01); *B32B 27/36* (2013.01); *B32B 27/38* (2013.01);
(Continued)

(58) Field of Classification Search
CPC ......... G02B 1/14; B32B 27/281; B32B 27/36; B32B 27/38; B32B 2255/10; B32B 2255/26; B32B 2307/54; B32B 2307/546; B32B 2307/712; B32B 2457/20; B32B 27/08; B32B 2250/05; B32B 2250/24; B32B 27/285; B32B 27/286;
(Continued)

(56) References Cited

U.S. PATENT DOCUMENTS 9,706,649 B2   7/2017   Jung et al.
9,765,234 B2   9/2017   Kang et al.
(Continued)

FOREIGN PATENT DOCUMENTS

CN    108299899 A    7/2018
JP    2015112599 A   6/2015
(Continued)

*Primary Examiner* — John D Freeman
(74) *Attorney, Agent, or Firm* — THE WEBB LAW FIRM

(57) ABSTRACT

Provided is a hard coating film. The hard coating film includes a base layer and a hard coating layer disposed on the base layer and having a pencil hardness of 4H or higher. A surface elongation at break of the hard coating film falls within a predetermined range, as measured by a certain method. The hard coating film shows excellent durability under high-temperature/high-humidity conditions, has no microcracks formed after repeated folding, and shows excellent pencil hardness.

11 Claims, 1 Drawing Sheet

(51) Int. Cl.
  *C08J 7/04*   (2020.01)
  *B32B 27/36*  (2006.01)
  *B32B 27/38*  (2006.01)

(52) U.S. Cl.
  CPC ......... *C08J 7/0427* (2020.01); *B32B 2255/10* (2013.01); *B32B 2255/26* (2013.01); *B32B 2307/54* (2013.01); *B32B 2307/546* (2013.01); *B32B 2307/712* (2013.01); *B32B 2457/20* (2013.01); *C08J 2379/08* (2013.01); *C08J 2483/06* (2013.01)

(58) Field of Classification Search
  CPC .......... B32B 2307/51; B32B 2307/732; B32B 27/308; B32B 2307/21; B32B 2307/536; B32B 2307/7145; B32B 2457/202; B32B 2457/204; B32B 27/34; B32B 27/365; C08J 7/0427; C08J 2379/08; C08J 2483/06; C08J 5/18; G09G 2380/02; G09F 9/301
  See application file for complete search history.

(56) References Cited

U.S. PATENT DOCUMENTS

| | | | |
|---|---|---|---|
| 2014/0162035 | A1 | 6/2014 | Yamamoto et al. |
| 2015/0093585 | A1* | 4/2015 | Bae ................. C08G 59/42 |
| | | | 522/170 |
| 2015/0159044 | A1 | 6/2015 | Bae et al. |
| 2016/0145467 | A1* | 5/2016 | Fukaumi ........... C09D 183/06 |
| | | | 524/588 |
| 2016/0319076 | A1* | 11/2016 | Ju ..................... C08G 73/1003 |
| 2017/0335063 | A1* | 11/2017 | Park ................. C08G 73/1007 |
| 2018/0066158 | A1 | 3/2018 | Lee et al. |
| 2018/0142127 | A1* | 5/2018 | Park ................. C08G 59/22 |
| 2020/0142102 | A1* | 5/2020 | Kikuchi ............ C08J 5/12 |
| 2020/0174161 | A1* | 6/2020 | Ahn ................. C08K 5/101 |

FOREIGN PATENT DOCUMENTS

| | | | |
|---|---|---|---|
| KR | 1020130003339 A | | 1/2013 |
| KR | 1020130074167 A | | 7/2013 |
| KR | 101470466 B1 | | 12/2014 |
| KR | 101580066 B1 | | 12/2015 |
| KR | 1020160057221 A | | 5/2016 |
| WO | WO-2018207914 A1 * | 11/2018 | ............ B32B 27/00 |

\* cited by examiner

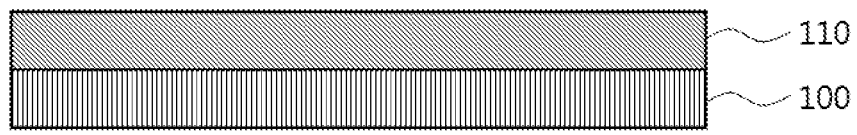

HARD COATING FILM AND FLEXIBLE DISPLAY PANEL INCLUDING THE SAME

CROSS-REFERENCE TO RELATED APPLICATIONS

This application claims priority to Korean Patent Application Nos. 10-2019-0015554 and 10-2019-0167883, filed Feb. 11, 2019 and Dec. 16, 2019, respectively, the disclosures of which are incorporated herein by reference in their entirety.

TECHNICAL FIELD

The following disclosure relates to a hard coating film and a flexible display panel including the same, and more particularly, to a hard coating film including a base layer and a hard coating layer, and a flexible display panel including the same.

BACKGROUND

In recent years, thin display devices using flat panel display devices such as liquid crystal display devices or organic light emitting diode display devices are receiving huge attention. In particular, such thin display devices are realized in the form of a touch screen panel, and thus have been used for various smart devices which feature portability, including various wearable devices as well as smart phones, tablet PCs, and the like.

Such portable touch screen panel-based display devices have a display-protective window cover on a display panel in order to protect the display panel from scratches or external impact. In most cases, tempered glass for display devices is used as the window cover. The tempered glass for display devices is thinner than conventional glass, but is characterized in that it is manufactured so that it has high strength and is also resistant to scratches.

However, the tempered glass has a drawback in that it is very heavy, which makes it unsuitable for use in lightweight portable devices. Also, the tempered glass has problems in that it is difficult to achieve an easily unbreakable nature because it is vulnerable to external impact, and it is not suitable for flexible display materials having a bendable or foldable function because it does not bend to a certain extent.

In recent years, a wide range of reviews of plastic covers for optics, which have strength or scratch resistance corresponding to the tempered glass while ensuring flexibility and impact resistance, are on the way.

In general, the transparent plastic cover material for optics, which is more flexible than the tempered glass, includes polyethylene terephthalate (PET), polyethersulfone (PES), polyethylene naphthalate (PEN), polyacrylate (PAR), polycarbonate (PC), polyimide (PI), polyaramid (PA), polyamide imide (PAI), and the like. As one example, Korean Patent Laid-Open Publication No. 10-2013-0074167 also discloses a plastic substrate.

However, these polymeric plastic substrates have drawbacks in that they have poor physical properties such as low hardness and scratch resistance and also show insufficient impact resistance, compared to the tempered glass used as the window cover for protecting display devices. Accordingly, various attempts have been made to make up for the insufficient properties by coating these plastic substrates with a composite resin composition.

For the conventional hard coating, a composition including a resin containing a photocurable functional group (such as (meth)acrylate, epoxy, or the like), a curing agent or curing catalyst, and other additives is used. However, the composition has drawbacks in that it is difficult to achieve high hardness corresponding to that of the tempered glass, a curl phenomenon may occur severely due to its shrinkage during curing, and it is not suitable as a protective window substrate for application to flexible display devices due to its insufficient flexibility as well.

RELATED ART DOCUMENT

Patent Document

Korean Patent Laid-Open Publication No. 10-2013-0074167

SUMMARY

An embodiment of the present invention is directed to providing a hard coating film having improved durability and mechanical characteristics.

Another embodiment of the present invention is directed to providing a flexible display panel having improved durability and mechanical characteristics.

In one general aspect, a hard coating film includes a base layer; and a hard coating layer disposed on at least one surface of the base layer and having a pencil hardness of 4H or higher, wherein a surface elongation at break of the hard coating film is in a range of 10% to 50%. Here, the surface elongation at break represents an elongation at a point of time at which any one of the base layer and the hard coating layer is broken beforehand when the hard coating film is set so that a length of the hard coating film to which a tensile force is applied in a tensile strength tester is 50 mm, and then elongated at a rate of 50 mm/min.

The surface elongation at break of the hard coating film may be in a range of 15% to 30%.

The hard coating film may have a weather-resistant surface elongation at break of 5% to 50%. Here, the weather-resistant surface elongation at break represents a surface elongation at break measured after the hard coating film is kept for 250 hours under conditions of 60° C. and 90% relative humidity.

The weather-resistant surface elongation at break of the hard coating film may be in a range of 10% to 30%.

The hard coating film may satisfy the following Equation 1:

$$0.2 \leq B/A \leq 7 \qquad [\text{Equation 1}]$$

wherein A is represented by the following Equation 2, and B is represented by the following Equation 3, wherein the weather-resistant tensile strength in Equation 2 represents a tensile strength measured after the hard coating film is kept for 250 hours under conditions of 60° C. and 90% relative humidity, and the weather-resistant surface elongation at break in Equation 3 represents a surface elongation at break measured after the hard coating film is kept for 250 hours under conditions of 60° C. and 90% relative humidity.

$$A = \frac{|\text{Weather} - \text{Resistant Tensile Strength} - \text{Tensile Strength}|}{\text{Tensile Strength}} \quad \text{[Equation 2]}$$

$$B = \frac{|\text{Weather} - \text{Resistant Surface Elongation at Break} - \text{Surface Elongation at Break}|}{\text{Surface Elongation at Break}} \quad \text{[Equation 3]}$$

In Equation 1, B may be less than or equal to 0.6.

The base layer may have a tensile modulus of 3 to 8 GPa.

A thickness ratio of the base layer and the hard coating layer may be in a range of 1:0.06 to 1:0.6.

The plurality of base layers and/or hard coating layers may be stacked.

The hard coating film may further include an antifouling layer, an antistatic layer, or an antireflective layer disposed on at least one surface of the base layer or the hard coating layer.

The base layer may include at least one selected from the group consisting of a polyethylene terephthalate (PET)-based resin, a polyethersulfone (PES)-based resin, a polyethylene naphthalate (PEN)-based resin, a polyacrylate (PAR)-based resin, a polycarbonate (PC)-based resin, a polyimide (PI)-based resin, a polyaramid (PA)-based resin, and a polyamide imide (PAI)-based resin.

The base layer may include a polyamide imide-based resin or a polyethylene terephthalate-based resin.

The hard coating layer may include an epoxysilane-based resin.

In another general aspect, a flexible display panel includes the hard coating film according to the exemplary embodiments as described above.

BRIEF DESCRIPTION OF THE DRAWING

FIG. 1 is a schematic diagram showing a hard coating film according to an exemplary embodiment of the present invention.

DETAILED DESCRIPTION OF EMBODIMENTS

Exemplary embodiments of the present invention provide a hard coating film and a flexible display panel including the same, wherein the hard coating film includes a base layer and a hard coating layer having a pencil hardness of 4H or higher, wherein a surface elongation at break of the hard coating film falls within a predetermined range, as measured by a certain method.

Hereinafter, embodiments of the present invention will be described in detail. However, it should be understood that the embodiments of the present invention are given for the purpose of illustration only, and are not intended to limit the scope of the present invention.

FIG. 1 is a schematic diagram showing a hard coating film according to an exemplary embodiment of the present invention.

Referring to FIG. 1, a hard coating film 10 according to an exemplary embodiment may include a base layer 100 and a hard coating layer 110.

The hard coating film 10 may have a surface elongation at break of 10% to 50%.

In the present invention, the surface elongation at break may represent an elongation at a point of time at which any one of the base layer 100 and the hard coating layer 110 is broken beforehand when the hard coating film 10 is set so that a length of the hard coating film 10 to which a tensile force is applied in a tensile strength tester is 50 mm, and then elongated at a rate of 50 mm/min. For example, the hard coating layer 110 may be broken earlier than the base layer 100.

According to exemplary embodiments, when the surface elongation at break falls within this range, the hard coating film 10 may have excellent mechanical strength and flexibility, resulting in improved folding characteristics. When the surface elongation at break is less than 10%, the flexibility of the hard coating film 10 may be degraded, resulting in degraded folding characteristics. On the other hand, when the surface elongation at break is greater than 50%, the mechanical strength (for example, pencil hardness) of the hard coating film 10 may be degraded. Preferably, the surface elongation at break of the hard coating film 10 may be in a range of 10% to 45%, 15% to 40%, or 15% to 30%.

The term "folding characteristics" used in this specification may mean that a modified portion (e.g., a folded portion) of the hard coating film 10 is not permanently deformed and/or damaged even when the hard coating film 10 is repeatedly modified (for example, folded and unfolded) several times.

According to a comparative embodiment, a hard coating film consisting of a single layer of hard coating layer has an insufficient elongation. For example, the hard coating layer itself may be immediately broken without being elongated when the elongation is measured using a method of measurement. That is, the surface elongation at break may be 0. Accordingly, the hard coating film composed of the single layer of hard coating layer may be easily permanently deformed or damaged by modification.

According to exemplary embodiments, when the hard coating layer 110 is stacked with the base layer 100, the surface elongation at break of the hard coating film 10 may be improved.

According to some embodiments, a chemical interaction between a compound used to form the hard coating layer 110 and a compound used to form the base layer 100 may occur in an interface between the hard coating layer 110 and the base layer 100. Mechanical characteristics of the hard coating layer 110 may be changed by the chemical interaction. Therefore, the surface elongation at break of the hard coating film 10 may be enhanced.

According to exemplary embodiments, surface characteristics of the hard coating layer 110 may be modified by a chemical bond between a functional group (for example, a carbonyl group (—CO—) of a polyamide imide-based resin) on a surface of the base layer 100 and a functional group on a surface of the hard coating layer 110. Therefore, the total tensile strength of the hard coating layer 110 may be enhanced. For example, a hydrogen bond between a carbonyl group (—CO—) included in a polyamide imide-based resin of the base layer 100 and a hydroxyl group (—OH) included in the hard coating layer 110 may be formed to enhance tensile strength of the hard coating layer 110. Therefore, the total surface elongation at break of the hard coating film 10 may be improved.

According to exemplary embodiments, the hard coating film may have a surface elongation at break after a weather resistance test, that is, a weather-resistant surface elongation at break, of 5% to 50%. The weather resistance test may be carried out by keeping the hard coating film 10 for 250 hours under conditions of 60° C. and 90% relative humidity. That is, the hard coating film 10 may have a surface elongation at break of 5% to 50% even after the hard coating film 10 is kept under high-temperature/high-humidity conditions. When the weather-resistant surface elongation at break of the hard coating film 10 is less than 5%, folding characteristics of the hard coating film 10 may be degraded. On the other hand, when the weather-resistant surface elongation at break of the hard coating film 10 is greater than 50%, mechanical strength of the hard coating film 10 may also be lowered. Preferably, the weather-resistant surface elongation at break of the hard coating film 10 may be in a range of 8% to 40%, 10% to 30%, or 10% to 20%.

When the surface elongation at break of hard coating film 10 before the weather resistance test is greater than 50%, and the surface elongation at break after the weather resistance test, that is, a weather-resistant surface elongation at break, is in a range of 5% to 50%, the hard coating film 10 has low mechanical strength, and folding characteristics of the hard coating film 10 may be degraded. On the other hand, when the surface elongation at break before the weather resistance test is in a range of 10% to 50% and the weather-resistant surface elongation at break is less than 5%, folding characteristics of the hard coating film 10 may be degraded.

According to exemplary embodiments, the hard coating film may satisfy the following Equation 1 before and after the weather resistance test in which the hard coating film 10 is kept for 250 hours under conditions of 60° C. and 90% relative humidity.

$$0.2 \leq B/A \leq 7 \qquad \text{[Equation 1]}$$

In Equation 1, A is an absolute rate of change of the tensile strength before and after the weather resistance test, and may be represented by the following Equation 2. Also, in Equation 1, B is an absolute rate of change of the surface elongation at break strength before and after the weather resistance test, and may be represented by the following Equation 3.

$$A = \frac{|\text{Weather} - \text{Resistant Tensile Strength} - \text{Tensile Strength}|}{\text{Tensile Strength}} \qquad \text{[Equation 2]}$$

$$B = \frac{|\text{Weather} - \text{Resistant Surface Elongation at Break} - \text{Surface Elongation at Break}|}{\text{Surface Elongation at Break}} \qquad \text{[Equation 3]}$$

wherein the weather-resistant tensile strength represents a tensile strength measured after a weather resistance test, that is, after the hard coating film is kept for 250 hours under conditions of 60° C. and 90% relative humidity, and the weather-resistant surface elongation at break represents a surface elongation at break measured after the weather resistance test.

When the hard coating film 10 satisfies Equation 1, a difference between the absolute rate of change of the surface elongation at break and the absolute rate of change of the tensile strength before and after the weather resistance test may fall within this predetermined range. For example, the A value may be 7-folds lower than the B value. In this case, each of the surface elongation at break and the tensile strength of the hard coating film 10 may be changed to a similar extent even when the hard coating film 10 is kept under severe high-temperature/high-humidity conditions.

Therefore, the hard coating film 10 may have a similar tendency in elongation and tensile characteristics even under common conditions, and thus may be effectively modified and restored, without any physical damage, due to its enhanced flexibility. Also, physical damage such as cracks, and the like may be suppressed even when the hard coating film 10 is repeatedly folded and unfolded.

When the B/A value is less than 0.2 or greater than 7, there may be a big difference in the elongation and tensile characteristics of the hard coating film. Therefore, durability may be severely degraded when the hard coating film 10 is repeatedly modified.

According to exemplary embodiments, the B/A value may be preferably $0.3 \leq B/A \leq 5$, and more preferably $0.4 \leq B/A \leq 2.5$. Within this range, durability to modification of the hard coating film 10 may be further improved.

The crack may refer to a microcrack. The term "microcrack" used in this specification may commonly refer to a crack having a size undetectable with the naked eye. The microcrack may, for example, refer to a crack having a width of 2 mm or less and a length of 50 mm or less, and may be observed using a microscope.

Commonly, a flexible display device involves modification, for example, folding when repeatedly used. When microcracks occur due to the modification, the number of microcracks increases with the repeated modification. Accordingly, the microcracks may be brought together to form cracks visible with the naked eye. Also, as the number of the cracks increases, flexibility of the flexible display device may be degraded, thereby causing the breakup of the flexible display device during folding. Also, moisture and the like may penetrate into the cracks, resulting in degraded durability of the flexible display device.

The hard coating film according to exemplary embodiments of the present invention may substantially prevent the occurrence of the microcracks, thereby ensuring durability and long-term life expectancy of the flexible display device.

According to exemplary embodiments, B value in Equation 1 may be less than or equal to 0.6. When the B value is greater than 0.6, a restoring force of the hard coating film 10 may be reduced. Accordingly, permanent deformation or cracks may be easily caused during the folding. Preferably, the B value may be less than or equal to 0.5, 0.3, 0.2, or 0.15.

According to exemplary embodiments, the base layer 100 may have a tensile modulus of 3 to 8 GPa, as measured according to the ASTM D111. Preferably, the tensile modulus of the base layer 100 may be in a range of 4 to 7 GPa, and more preferably in a range of 5 to 6.5 GPa. In this case, the base layer 100 may flexibly support the hard coating layer 110, and may improve the pencil hardness of the hard coating film 10. Also, the base layer 100 may be stacked with the hard coating layer 110 to form a hard coating film 10 that satisfies the properties of Equation 1. For example, when the tensile modulus is less than 3 GPa, pencil hardness of the hard coating film 10 may be degraded.

According to exemplary embodiments, the base layer 100 may include a material having a predetermined elastic force and restoring force. For example, the base layer 100 may include at least one selected from the group consisting of a polyethylene terephthalate (PET)-based resin, a polyethersulfone (PES)-based resin, a polyethylene naphthalate (PEN)-based resin, a polyacrylate (PAR)-based resin, a polycarbonate (PC)-based resin, a polyimide (PI)-based resin, a polyaramid (PA)-based resin, and a polyamide imide (PAI)-based resin. Preferably, the base layer 100 may include a polyamide imide-based resin or a polyethylene terephthalate-based resin.

According to exemplary embodiments, the base layer 100 may include a polyimide-based resin, particularly a polyimide-based resin having a polyamide imide structure.

That is, according to exemplary embodiments, the base layer 100 may include a polyamide imide-based resin.

According to exemplary embodiments, the polyamide imide-based resin may contain a fluorine atom. More desirably, the polyamide imide-based resin may contain a fluorine atom and an aliphatic ring. In this case, the base layer 100 may have excellent mechanical properties and dynamic bending characteristics.

According to some embodiments, the base layer 100 may be formed of a polyamide imide-based resin alone.

According to exemplary embodiments, the polyamide imide-based resin may be a copolymer of (a) an aromatic diamine, (b) a dianhydride and (c) an aromatic dicarboxylic acid, or a derivative thereof.

According to exemplary embodiments, the aromatic diamine (a) may be a fluorine-based aromatic diamine, that is, an aromatic diamine containing a fluorine atom.

According to some embodiments, the fluorine-based aromatic diamine may be 2,2'-bis(trifluoromethyl)-benzidine, but the present invention is not particularly limited thereto. In this case, 2,2'-bis(trifluoromethyl)-benzidine may be used alone as the aromatic diamine (a), and may be used in combination with other aromatic diamine components known in the art. As described above, when the fluorine-based aromatic diamine is used, optical characteristics of the polyamide imide-based film may be improved, and a yellow index may also be improved. Also, the tensile strength of the polyamide imide-based film may be enhanced to enhance the mechanical strength of the hard coating film and further improve dynamic bending characteristics of the hard coating film.

According to some embodiments, the dianhydride (b) may be a dianhydride having an aromatic ring, a dianhydride having an aliphatic ring, or a mixture thereof.

According to some embodiments, the dianhydride having an aromatic ring may include any one or more selected from 4,4'-hexafluoroisopropylidene diphthalic anhydride (6FDA), biphenyltetracarboxylic dianhydride (BPDA), oxydiphthalic dianhydride (ODPA), sulfonyl diphthalic anhydride (SO2DPA), (isopropylidenediphenoxy) bis(phthalic anhydride) (6HDBA), 4-(2,5-dioxotetrahydrofuran-3-yl)-1,2,3,4-tetrahydronaphthalene-1,2-dicarboxylic dianhydride (TDA), 1,2,4,5-benzenetetracarboxylic dianhydride (PMDA), benzophenonetetracarboxylic dianhydride (BTDA), bis(carboxyphenyl) dimethylsilane dianhydride (SiDA), bis(dicarboxyphenoxy) diphenylsulfide dianhydride (BDSDA), and the like, but the present invention is not particularly limited thereto.

According to some embodiments, the dianhydride having an aliphatic ring may include any one or more selected from 1,2,3,4-cyclobutanetetracarboxylic dianhydride (CBDA), 5-(2,5-dioxotetrahydrofuryl)-3-methylcyclohexene-1,2-dicarboxylic dianhydride (DOCDA), bicyclo[2.2.2]oct-7-ene-2,3,5,6-tetracarboxylic dianhydride(BTA), bicyclooctene-2,3,5,6-tetracarboxylic dianhydride (BODA), 1,2,3,4-cyclopentanetetracarboxylic dianhydride (CPDA), 1,2,4,5-cyclohexanetetracarboxylic dianhydride (CHDA), 1,2,4-tricarboxy-3-methylcarboxycyclopentane dianhydride (TMDA), 1,2,3,4-tetracarboxycyclopentane dianhydride (TCDA), and the like, but the present invention is not particularly limited thereto.

According to exemplary embodiments, the aromatic dicarboxylic acid (c) or a derivative thereof may be an aromatic dicarboxylic acid in which benzene, biphenyl, or naphthalene is substituted with two carboxylic groups or two derivatives of the carboxylic groups. The derivative of the carboxylic group may contain an acid chloride group (—COCl).

According to exemplary embodiments, the aromatic dicarboxylic acid (c) or a derivative thereof may be an aromatic diacid dichloride. The aromatic diacid dichloride may be polymerized with the aromatic diamine (a) to form an amide structure in a chain. Accordingly, optical properties and mechanical strength of the base layer 100 may be improved.

According to some embodiments, the aromatic diacid dichloride may include any one or more selected from isophthaloyl dichloride (IPC), terephthaloyl dichloride (TPC), [1,1'-biphenyl]-4,4'-dicarbonyl dichloride (BPC), 1,4-naphthalene dicarboxylic dichloride (NPC), 2,6-naphthalene dicarboxylic dichloride (NTC), 1,5-naphthalene dicarboxylic dichloride (NEC), and the like, but the present invention is not particularly limited thereto.

According to exemplary embodiments, the polyamide imide-based resin containing a fluorine atom and an aliphatic ring may be prepared by a 2-step polymerization reaction. For example, the 2-step polymerization reaction may include polymerizing a first fluorine-based aromatic diamine and an aromatic diacid dichloride to prepare a polyamide-based oligomer (Step 1), and polymerizing the polyamide-based oligomer, a second fluorine-based aromatic diamine, a dianhydride having an aromatic ring, and a dianhydride having an aliphatic ring (Step 2). In this case, the polyamide imide-based resin having characteristics required in the present invention may be prepared more easily. The first fluorine-based aromatic diamine and the second fluorine-based aromatic diamine may be the same as or different from each other.

As described above, when the polyamide imide-based resin is prepared by the 2-step polymerization reaction, a polyamide-based oligomer having an amine group at an end thereof is prepared in Step 1, which may serve as a monomer in Step 2. In this case, a block-type polyamide imide-based resin having a polyamide-based block may be prepared. Such a block-type polyamide imide-based resin is characterized in that it has improved optical characteristics, mechanical strength, dynamic bending characteristics, and the like. Also, the block-type polyamide imide-based resin has an advantage of having a wide range of choice of coating solvents due to the diversity of solubility.

According to some embodiments, in Step 1, the first fluorine-based aromatic diamine and the aromatic diacid dichloride may be used at a molar ratio of 1:0.5 to 1:1, and more desirably 1:0.5 to 1:0.8, but the present invention is not particularly limited thereto.

According to some embodiments, in Step 2, a ratio of the total number of moles of the polyamide-based oligomer and the second fluorine-based aromatic diamine and the total number of moles of the dianhydride having an aromatic ring and the dianhydride having an aliphatic ring may be in a range of 1:0.9 to 1:1.1, and more desirably 1:1.

According to some embodiments, in Step 2, an amount of the polyamide-based oligomer used may be greater than or equal to 30 mol %, desirably 50 mol %, and more desirably 70 mol %, based on the total number of moles of the polyamide-based oligomer and the second fluorine-based aromatic diamine. In this case, mechanical properties, yellow index, and optical characteristics of the polyamide imide-based film may be further improved. Of course, the present invention is not limited thereto.

According to some embodiments, in Step 2, the dianhydride having an aromatic ring and the dianhydride having an aliphatic ring may be used at a molar ratio of 3:7 to 8:2, but the present invention is not particularly limited thereto. In this case, a favorable effect on transparency, yellow index, and mechanical properties of the polyamide imide-based film may be exhibited.

According to other exemplary embodiments, the polyamide imide-based resin containing a fluorine atom and an aliphatic ring may be prepared by polymerizing a fluorine-based aromatic diamine, a dianhydride having an aromatic ring, a dianhydride having an aliphatic ring, and an aromatic diacid dichloride and imidizing the polymerization reaction product. In this case, a random copolymer, that is, a random-type polyamide imide-based resin, may be prepared. The random-type polyamide imide-based resin may show solvent sensitivity somewhat different from the aforementioned block-type polyamide imide-based resin due to the difference in optical characteristics, mechanical properties, and surface energy, which also falls within the scope of the present invention.

In this case, the dianhydride having an aromatic ring may be used at 40 moles or more, and more desirably 50 to 80 moles, based on 100 moles of the fluorine-based aromatic diamine. Also, the dianhydride having an aliphatic ring may be used at 10 to 60 moles, based on 100 moles of the fluorine-based aromatic diamine.

Also, a ratio of the total number of moles of the fluorine-based aromatic diamine and the total number of moles of the dianhydride having an aromatic ring, the dianhydride having an aliphatic ring, and the aromatic diacid dichloride may be in a range of 1:0.9 to 1:1.1, and more desirably 1:1.

Hereinafter, a method of preparing a base layer 100 will be described by way of example only.

According to exemplary embodiments, the base layer 100 may be prepared by applying a "polyamide imide-based resin solution" including a polyamide imide-based resin and a solvent onto a base, and drying the base or drying and elongating the base. That is, the base layer 100 may be prepared using a solution casting method.

Hereinafter, a method of preparing a polyamide imide-based film will be described in further detail, for example, with reference to a case for preparing a block-type polyamide imide-based film. The block-type polyamide imide-based film may be prepared using the block-type polyamide imide-based resin as described above.

According to exemplary embodiments, the base layer 100 may be prepared by a method, which includes polymerizing a first fluorine-based aromatic diamine and an aromatic diacid dichloride to prepare a polyamide-based oligomer; polymerizing the polyamide-based oligomer, a second fluorine-based aromatic diamine, a dianhydride having an aromatic ring, and a dianhydride having an aliphatic ring to prepare a polyamic acid; imidizing the polyamic acid to prepare a polyamide imide-based resin; and applying a polyamide imide-based resin solution, in which the polyamide imide-based resin is dissolved in an organic solvent, to form a film. In this case, the first fluorine-based aromatic diamine and the second fluorine-based aromatic diamine may be the same as or different from each other.

According to some embodiments, the preparing of the polyamide-based oligomer may include reacting a first fluorine-based aromatic diamine and an aromatic diacid dichloride; and purifying and drying the resulting reaction product. In this case, a molecular weight of the polyamide-based oligomer is not particularly limited. For example, a weight average molecular weight of the polyamide-based oligomer may be in a range of 1,000 to 3,000 g/mol. In this case, the polyamide-based oligomer may be advantageous in improving the physical properties of the base layer 100.

According to some embodiments, the preparing of the polyamic acid may include solution-polymerizing a second fluorine-based aromatic diamine, a dianhydride having an aromatic ring, and a dianhydride having an aliphatic ring with a polyamide-based oligomer. In this case, an organic solvent that may be used for the solution polymerization may, for example, include any one or more selected from dimethylacetamide (DMAc), N-methyl-2-pyrrolidone (NMP), dimethylformamide (DMF), dimethylformsulfoxide (DMSO), ethyl cellosolve, methyl cellosolve, acetone, diethyl acetate, m-cresol, and the like.

According to some embodiments, the preparing of the polyamide imide-based resin may be performed by chemically imidizing the polyamic acid. For example, the polyamic acid may be chemically imidized using pyridine and an acetic anhydride. Then, the polyamic acid may be imidized at a temperature of 150° C. or lower, desirably 100° C. or lower, and particularly 50 to 150° C. using an imidization catalyst and a dehydrating agent. In this case, the entire polyamide imide-based film may be endowed with uniform mechanical properties, compared to films prepared by a method of imidizing a polyamic acid by application of heat at a high temperature.

In this case, any one or more selected from pyridine, isoquinoline, β-quinoline, and the like may be used as the imidization catalyst. Also, any one or more selected from an acetic anhydride, a phthalic anhydride, a maleic anhydride, and the like may be used as the dehydrating agent. Of course, the present invention is not limited thereto.

According to some embodiments, the polyamide imide-based resin may be prepared by mixing additives such as a flame retardant, an adhesion enhancer, inorganic particles, an antioxidant, a UV blocking agent, a plasticizer, and the like with the polyamic acid.

According to some embodiments, after the polyamic acid is imidized, the polyamide imide-based resin may be purified with a solvent to obtain solids. Then, the obtained solids may be dissolved in a solvent to obtain a polyamide imide-based solution. In this case, the solvent may, for example, include N,N-dimethylacetamide (DMAc), and the like, but the present invention is not limited thereto.

According to some embodiments, the applying of the polyamide imide-based resin solution to form a film may be performed by applying the polyamide imide-based solution on to a base, and drying the base. Also, the elongation may be performed after or before drying, when necessary. After the drying or elongation step, heat treatment may be further performed. For example, glass, stainless steel, a film, or the like may be used as the base, but the present invention is not limited thereto. Also, the application may be performed using a die coater, air knife, a reverse roll, a spray, a blade, casting, gravure, spin coating, and the like.

A thickness of the base layer 100 may, for example, be in a range of 10 μm to 250 μm, but the present invention is not limited thereto.

The hard coating layer 110 may be disposed on at least one surface of the base layer 100. For example, the hard coating layer 110 may be disposed on an upper surface of the base layer 100, and may be disposed on upper and lower surfaces of the base layer 100, respectively. The hard coating layer 110 may protect the base layer 100 having excellent optical and mechanical characteristics from external physical and chemical damages.

The hard coating layer 110 may have a pencil hardness of 4H or higher. The hard coating layer 110 may physically protect the base layer 100, and may have a predetermined tensile modulus and tensile strength. Therefore, when the hard coating layer 110 has a range of the pencil hardness described above, the hard coating layer 110 may have a surface elongation at break and a tensile strength as described above in Equation 1 when the hard coating layer 110 is stacked with the base layer 100.

According to some embodiments, the hard coating layer 110 may include an epoxy silane-based resin.

According to some embodiments, the hard coating layer 110 may include an epoxy siloxane-based resin.

For example, the hard coating layer 110 may be formed from a composition for forming a hard coating layer, which includes the epoxy siloxane-based resin.

For example, the epoxy siloxane-based resin may be a siloxane-based resin containing an epoxy group. The epoxy group may include one or more selected from a cyclic epoxy group, an aliphatic epoxy group, and an aromatic epoxy group. The siloxane-based resin may refer to a polymeric compound in which a silicon atom and an oxygen atom are taken together to form a covalent bond.

The epoxy siloxane-based resin may, for example, be a silsesquioxane resin substituted with an epoxy group. For example, the epoxy siloxane-based resin may be that in which the silicon atom of the silsesquioxane resin is directly substituted with an epoxy group or the substituent on the silicon atom is substituted with an epoxy group. As a non-limiting example, the epoxy siloxane-based resin may be a silsesquioxane resin substituted with a 2-(3,4-epoxycyclohexyl) group or a 3-glycidoxy group.

According to some embodiments, the epoxy siloxane-based resin may have a weight average molecular weight of 1,000 to 20,000, more preferably 1,000 to 18,000, and further preferably 2,000 to 15,000. When the weight average molecular weight of the epoxy siloxane-based resin falls within this molecular weight range, the composition for forming a hard coating layer may have a proper viscosity. Accordingly, flowability, applicability, curing reactivity, and the like of the composition for forming a hard coating layer may be further improved. Also, hardness of the hard coating layer may be further improved. Also, flexibility of the hard coating layer may be improved, resulting in further suppressed occurrence of curls.

The epoxy siloxane-based resin according to the present invention may be prepared by hydrolysis and condensation reactions of an alkoxysilane having an epoxy group alone in the presence of water or by hydrolysis and condensation reactions between an alkoxysilane having an epoxy group and another alkoxysilane in the presence of water. Also, the epoxysilane-based resin may be formed by polymerizing a silane compound containing an epoxycyclohexyl group.

For example, the alkoxysilane compound having an epoxy group includes 2-(3,4-epoxycyclohexyl)ethyltrimethoxysilane, 2-(3,4-epoxycyclohexyl)ethyltriethoxysilane, 3-glycidoxypropyltrimethoxysilane, and the like. These components may be used alone or in combination of two or more.

According to some embodiments, the epoxy siloxane-based resin may be included at 20 to 70 parts by weight, based on 100 parts by weight of the composition for forming a hard coating layer. More preferably, the epoxy siloxane-based resin may be included at 20 to 50 parts by weight, based on 100 parts by weight of the composition for forming a hard coating layer. When the content of the epoxy siloxane-based resin satisfies this range, the composition for forming a hard coating layer may have superior flowability and coatability. Also, it is possible to uniformly cure the composition for forming a hard coating layer when the composition is cured. As a result, physical defects such as cracks caused by excessive curing may be more effectively prevented. Also, the hard coating layer may exhibit superior hardness.

According to some embodiments, the composition for forming a hard coating layer may further include a crosslinking agent. The crosslinking agent may, for example, form a bridging bond with the epoxy siloxane-based resin to solidify the composition for forming a hard coating layer and improve the hardness of the hard coating layer.

According to exemplary embodiments, the crosslinking agent may include a compound having an alicyclic epoxy group. For example, the crosslinking agent may include a compound in which two 3,4-epoxycyclohexyl groups are linked. For example, the crosslinking agent may include a compound represented by the following Formula 1. The structure and physical properties of the crosslinking agent may be similar to those of the epoxy siloxane-based resin. In this case, the crosslinking agent may serve to promote crosslinking of the epoxy siloxane-based resin and maintain the composition at a proper level of viscosity.

[Formula 1]

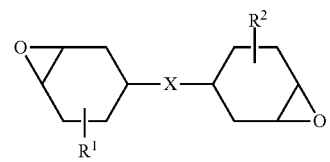

wherein $R^1$ and $R^2$ are each independently a linear or branched alkyl group having 1 to 5 carbon atoms, and X may be a direct bond; a carbonyl group; a carbonate group; an ether group; a thioether group; an ester group; an amide group; a linear or branched alkylene, alkylidene or alkoxylene group having 1 to 18 carbon atoms; a cycloalkylene or cycloalkylidene group having 1 to 6 carbon atoms; or a linking group thereof.

In this specification, the term "direct bond" refers to a structure in which groups are directly linked without any other functional groups. For example, in Formula 1, it may mean that two cyclohexanes are directly linked. Also, in the present invention, the term "linking group" may refer to a structure in which two or more of the aforementioned substituents are linked.

Also, in Formula 1, substitution positions of $R^1$ and $R^2$ are not particularly limited. For example, when it is assumed that carbon to which X is connected is marked by 1 and carbons to which an epoxy group is connected are marked by 3 and 4, $R^1$ and $R^2$ are more preferably substituted at the position 6.

The aforementioned compounds include a cyclic epoxy structure in the molecule. Therefore, the viscosity of the composition may be reduced to a proper extent by linearizing the epoxy structure as shown in Formula 1. This decrease in the viscosity may improve applicability of the composition, and may further improve reactivity of the epoxy group to promote a curing reaction as well. Also, the compounds may form a bridging bond with the epoxy siloxane-based resin to improve hardness of the hard coating layer.

A content of the crosslinking agent according to the present invention is not particularly limited. For example, the crosslinking agent may be included at 5 to 150 parts by weight, based on 100 parts by weight of the epoxy siloxane-based resin. When the content of the crosslinking agent falls within this range, the viscosity of the composition for forming a hard coating layer may be kept in a more proper extent, and applicability and curing reactivity may be improved.

Also, the crosslinking agent may, for example, be included at 3 to 30 parts by weight, based on a total of 100 parts by weight of the composition. More preferably, the crosslinking agent may be included at 5 to 20 parts by weight, based on a total of 100 parts by weight of the composition.

According to some embodiments, the composition for forming a hard coating layer may further include a photoinitiator or a thermal initiator.

According to some embodiments, the photoinitiator may include a photocationic initiator. The photocationic initiator may initiate polymerization of the epoxy siloxane-based resin and an epoxy-based monomer.

For example, an onium salt and/or an organometallic salt, and the like may be used as the photocationic initiator, but the present invention is not limited thereto. For example, a diaryliodonium salt, a triarylsulfonium salt, an aryldiazonium salt, an iron-arene complex, and the like may be used. These components may be used alone or in combination of two or more.

A content of the photoinitiator is not particularly limited. For example, the photoinitiator may be included at 0.1 to 15 parts by weight, and more preferably 1 to 15 parts by weight, based on 100 parts by weight of the epoxy siloxane-based resin. When the content of the photoinitiator falls within this range, curing efficiency of the composition for forming a hard coating layer may be maintained excellently, and degradation of the physical properties may be prevented due to the residual components after the curing.

Also, the photoinitiator may, for example, be included at 0.01 to 10 parts by weight, more preferably 0.1 to 10 parts by weight, and further preferably 0.3 to 5 parts by weight, based on a total of 100 parts by weight of the composition.

According to some embodiments, the composition for forming a hard coating layer may further include a solvent. The solvent is not particularly limited, and solvents known in the related art may be used herein.

Non-limiting examples of the solvent include alcohols (methanol, ethanol, isopropanol, butanol, methyl cellosolve, ethyl cellosolve, etc.), ketones (methyl ethyl ketone, methyl butyl ketone, methyl isobutyl ketone, diethyl ketone, dipropyl ketone, cyclohexanone, etc.), hexanes (hexane, heptane, octane, etc.), benzenes (benzene, toluene, xylene, etc.), and the like. These components may be used alone or in combination of two or more.

According to some embodiments, the solvent may be included at a residual amount excluding the amounts of the other components, based on the predetermined total weight of the composition. For example, when it is assumed that the predetermined total weight of the composition is 100 g and the sum of weights of the other components other than the solvent is 70 g, the solvent may be included at an amount of 30 g.

According to some embodiments, the composition for forming a hard coating layer may further include additives such as an inorganic filler, a lubricant, an antioxidant, a UV absorbent, a photostabilizer, a thermal polymerization inhibitor, a leveling agent, a surfactant, a lubricating agent, an antifoulant, and the like. The inorganic filler may improve the hardness of the hard coating layer.

A thickness of the hard coating layer 110 is not particularly limited, and may, for example, be in a range of 5 to 100 μm, and more preferably 5 to 50 μm. When the thickness of the hard coating layer 110 falls within this range, the hard coating layer 110 may have excellent hardness while maintaining optical characteristics.

According to exemplary embodiments, the hard coating layer 110 may be formed by applying the aforementioned composition for forming a hard coating layer onto an upper or lower surface of the base layer 100 and curing the composition. The curing may be performed by thermal curing or photocuring, and methods known in the related art may be used for the curing.

According to exemplary embodiments, a thickness ratio of the base layer 100 and the hard coating layer 110 may be in a range of 1:0.06 to 1:0.6.

When the thickness ratio of the hard coating layer 110 to the base layer 100 (a thickness of the hard coating layer/a thickness of the base layer) is less than 0.06, mechanical strength of the hard coating film 10 may be lowered. Also, insufficient interaction at the interface between the hard coating layer 110 and the base layer 100 may occur. Therefore, folding characteristics of the hard coating film 10 may be degraded.

When the thickness ratio of the hard coating layer 110 to the base layer 100 (a thickness of the hard coating layer/a thickness of the base layer) is greater than 0.6, flexibility of the hard coating film 10 may be degraded.

Preferably, the thickness ratio of the base layer 100 and the hard coating layer 110 may be in a range of 1:0.1 to 1:0.5, and more preferably 1:0.12 to 1:0.3. In this case, the hard coating film 10 may have superior mechanical strength, flexibility, and folding characteristics.

According to exemplary embodiments, the plurality of base layers 100 and the plurality of hard coating layers 110 may be stacked. For example, the plurality of base layers 100 and the plurality of hard coating layers 110 may be stacked in an alternate manner. Also, the hard coating layers 110 may be disposed on both surfaces of the base layer 100, respectively.

According to some embodiments, less than five base layers 100 and less than five hard coating layers 110 may be stacked.

According to exemplary embodiments, a functional layer such as an antifouling layer, an antistatic layer, an antireflective layer, or the like may be further disposed on at least one surface of the base layer 100 or the hard coating layer 110. For example, the base layer 100 is brought into contact with the hard coating layer 110, and the antifouling layer, the antistatic layer, or the antireflective layer may be disposed on least one surface of a stacked structure in which the base layers 100 and the hard coating layers 110 are stacked. As another example, a functional layer such as an antifouling layer, an antistatic layer, an antireflective layer, or the like may also be interposed between the base layer 100 and the hard coating layer 110.

According to some embodiments, because the hard coating film 10 has high surface hardness and excellent flexibility, is lighter than the tempered glass, and exhibits excellent durability to modification, the hard coating film 10 may be used as the outermost window substrate of a flexible display panel.

According to some embodiments, a flexible display device including the hard coating film 10 may be provided.

The hard coating film 10 may be used as the outermost window substrate of a flexible display device. The flexible display device may include various image display devices such as conventional liquid crystal display devices, electroluminescent display devices, plasma display devices, field emission display devices, and the like.

Hereinafter, preferred embodiments of the present invention are provided to aid in understanding the present invention. However, it should be appreciated by those skilled in the art that these embodiments are given by way of illustration of the present invention only, and are not intended to limit the scope of the present invention, and thus various changes and modification may be made to the embodiments of the present invention without departing from the spirit and scope of the present invention. Also, it will be apparent that such changes and modifications fall within the appended claims.

Preparation Example 1: Preparation of Composition for Forming Base Layer and Base Layer Film N,N-dimethylacetamide (DMAc), terephthaloyl dichloride (TPC), and 2,2'-bis(trifluoromethyl)-benzidine (TFMB) were put into a reactor, and stirred at 25° C. for 2 hours under a nitrogen atmosphere. In this case, a molar ratio of TPC and TFMB added was set to 3:4, and was then adjusted so that a content of solids was 10% by weight.

Thereafter, the reaction product was precipitated with an excessive amount of methanol, and then filtered to obtain solids. The solids were then dried at 50° C. for 6 hours or more under vacuum to obtain a polyamide-based oligomer. The obtained polyamide-based oligomer had a formula weight (FW) of 1,670 g/mol.

Next, DMAc, 100 moles of the polyamide-based oligomer, and 28.6 moles of TFMB were added to a reactor, and thoroughly stirred.

Subsequently, 64.3 moles of cyclobutanetetracarboxylic dianhydride (CBDA) and 64.3 moles of 4,4'-hexafluoroisopropylidene diphthalic anhydride (6FDA) were sequentially added to the reactor, thoroughly stirred, and then polymerized at 40° C. for 10 hours. In this case, a content of the solids was 20% by weight.

Then, pyridine and an acetic anhydride were put into a reactor at a molar amount (321.5 moles) 2.5 times higher than the total amount of the dianhydride added, and then stirred at 60° C. for 12 hours.

After the polymerization was completed, the polymerization reaction product was precipitated with an excessive amount of methanol, and then filtered to obtain solids. Then, the solids were dried at 50° C. for 6 hours or more under vacuum to obtain a polyamide imide powder. The obtained polyamide imide powder was diluted with 20% by weight of DMAc, and dissolved therein to prepare a polyamide imide-based resin solution, that is, a composition for forming a base layer.

The prepared composition for forming a base layer was cast onto a glass substrate to form a base layer film of Preparation Example 1. Thereafter, the base layer film was separated from the substrate. The thickness of the base layer film was 80 μm, and the tensile modulus according to the ASTM D111 was measured to be 6.1 GPa.

Preparation Examples 2 to 9: Preparation of Compositions for Forming Hard Coating Layer 2-(3,4-epoxycyclohexyl)ethyltrimethoxysilane (ECTMS, TCI) and water ($H_2O$) were mixed at a ratio of 24.64 g:2.70 g (0.1 mol:0.15 mol) to prepare a mixture. Thereafter, the mixture was put into a 250 mL 2-neck flask.

0.1 mL of a tetramethylammonium hydroxide catalyst (Sigma-Aldrich) and 100 mL of tetrahydrofuran (Sigma-Aldrich) were added to the mixture, and then stirred at 25° C. for 36 hours.

Next, layer separation was performed, and a product layer was extracted with methylene chloride (Sigma-Aldrich). The extract was dried over magnesium sulfate (Sigma-Aldrich) to remove moisture, and then dried under vacuum to obtain an epoxy siloxane-based resin.

The epoxy siloxane-based resin was measured using gel permeation chromatography (GPC). As a result, the epoxy siloxane-based resin had a weight average molecular weight of 2,500. The epoxy siloxane-based resin was measured by $^{29}Si$-NMR. As a result, a ratio of a ladder structure in the siloxane-based resin was greater than or equal to 98%.

The epoxy siloxane-based resins, the crosslinking agents, the photoinitiators, and the solvents were mixed at weight ratios, as listed in the following Table 1, to prepare compositions of Preparation Examples 2 to 9 for forming a hard coating layer.

TABLE 1

| Items | Epoxy siloxane-based resin | Crosslinking agent A | Crosslinking agent B | Photoinitiator | Solvent |
|---|---|---|---|---|---|
| Prep. Example 2 | 30 | 10 | 5 | 0.5 | 54.5 |
| Prep. Example 3 | 30 | 5 | 10 | 0.5 | 54.5 |
| Prep. Example 4 | 40 | 5 | — | 0.5 | 54.5 |
| Prep. Example 5 | 40 | — | 5 | 0.5 | 54.5 |
| Prep. Example 6 | 50 | 5 | — | 0.5 | 44.5 |
| Prep. Example 7 | 45 | — | 5 | 0.5 | 49.5 |
| Prep. Example 8 | 30 | 15 | — | 0.5 | 54.5 |
| Prep. Example 9 | 45 | — | — | 0.5 | 54.5 |

A: (3',4'-epoxycyclohexyl)methyl 3,4-epoxycyclohexane carboxylate
B: bis[(3,4-epoxycyclohexyl)methyl] adipate
Photoinitiator: (4-methylphenyl)[4-(2-methylpropyl)phenyl]iodonium hexafluorophosphate
Solvent: methyl ethyl ketone (Sigma-Aldrich)

Preparation Example 10: Preparation of Composition for Forming Hard Coating Layer 40 parts by weight of pentaerythritol tetraacrylate (PETA, Miwon Specialty Chemical Co., Ltd.), 1 part by weight of 1-hydroxycyclohexyl phenyl ketone, and 59 parts by weight of methyl ethyl ketone (Sigma-Aldrich) were mixed to prepare a composition of Preparation Example 10 for forming a hard coating layer.

Preparation Example 11: Preparation of
Composition for Forming Hard Coating Layer 40 parts by weight of ethylene oxide-modified pentaerythritol tetraacrylate (PEOETA, Miwon Specialty Chemical Co., Ltd.), 1 part by weight of 1-hydroxycyclohexyl phenyl ketone, and 59 parts by weight of methyl ethyl ketone (Sigma-Aldrich) were mixed to prepare a composition of Preparation Example 11 for forming a hard coating layer.

Preparation Example 12: Preparation of
Composition for Forming Hard Coating Layer 40 parts by weight of polyphosphazene acrylate (PPZ; Gongyoungsa Co., Ltd.), 1 part by weight of 1-hydroxycyclohexyl phenyl ketone, and 59 parts by weight of methyl ethyl ketone (Sigma-Aldrich) were mixed to prepare a composition of Preparation Example 12 for forming a hard coating layer.

Preparation Example 13: Preparation of
Composition for Forming Hard Coating Layer 40 parts by weight of decafunctional urethane acrylate (SC2153, Miwon Specialty Chemical Co., Ltd.), 1 part by weight of 1-hydroxycyclohexyl phenyl ketone, and 59 parts by weight of methyl ethyl ketone (Sigma-Aldrich) were mixed to prepare a composition of Preparation Example 13 for forming a hard coating layer.

Preparation Example 14: Preparation of
Composition for Forming Hard Coating Layer 40 parts by weight of a polymer containing an acryl group (SMP220A, Gongyoungsa Co., Ltd.), 1 part by weight of 1-hydroxycyclohexyl phenyl ketone, and 59 parts by weight of methyl ethyl ketone (Sigma-Aldrich) were mixed to prepare a composition of Preparation Example 14 for forming a hard coating layer.

Preparation Example 15: Preparation of
Composition for Forming Hard Coating Layer 40 parts by weight of a urethane-modified acrylate (NOF Corp.), 1 part by weight of 1-hydroxycyclohexyl phenyl ketone, and 59 parts by weight of methyl ethyl ketone (Sigma-Aldrich) were mixed to prepare a composition of Preparation Example 15 for forming a hard coating layer.

Preparation Example 16: Preparation of
Composition for Forming Hard Coating Layer 50 parts by weight of urethane-modified acrylate (NOF Corp.), 1 part by weight of 1-hydroxycyclohexyl phenyl ketone, and 59 parts by weight of methyl ethyl ketone (Sigma-Aldrich) were mixed to prepare a composition of Preparation Example 16 for forming a hard coating layer.

Examples and Comparative Examples

Each of the compositions for forming a hard coating layer prepared in Preparation Examples 2 to 14 was applied onto the base layer film of Preparation Example 1, or a PET film (V7610, SKC Corp., 100 μm) using a Meyer bar, as listed in the following Table 2, and then cured at 60° C. for 5 minutes. Thereafter, the film was irradiated with UV of 1 J/cm$^2$ using a high-pressure metal lamp, and then cured at 120° C. for 15 minutes to prepare a hard coating film on which a hard coating layer having a thickness of 10 μm was formed.

For each of the hard coating films prepared in Examples and Comparative Examples, the pencil hardness, the tensile strength, and the surface elongation at break were measured according to the following evaluation methods. The results are listed in Table 2.

Also, weather resistance tests were performed on the hard coating films prepared in Examples and Comparative Examples. Specifically, each of the hard coating films was kept for 250 hours under conditions of 60° C. and 90% relative humidity, and the tensile strength, the surface elongation at break, and the folding characteristics were measured according to the following evaluation methods. The results are listed in Table 2.

<Evaluation Method>

1. Measurement of Pencil Hardness of Hard Coating Film

A surface of the hard coating layer of each of the hard coating films was measured for pencil hardness.

The pencil hardness of each of pencils (Mitsubishi Pencil Co., Ltd.) with different hardness was measured under a load of 0.75 kg according to the ASTM D3363 using a pencil hardness tester (Kipae E&T Co., Ltd.).

2. Measurement of Tensile Strength and Surface Elongation at Break of Hard Coating Film Each of the hard coating films was cut into pieces with a size of 10 mm×100 mm, thereby preparing specimens.

The tensile characteristics of the prepared specimens were measured according to the ASTM D882 using a universal testing machine (UTM; Instron Co., Ltd.). First, both ends of the specimen were fixed with a UTM's grip so that a long axis of the specimen was aligned with a tensile direction. In this case, the specimen was set so that a distance between the initial grips of UTM, that is, a length of the specimen to which a tensile force is applied, was 50 mm. Thereafter, the specimen was elongated at a rate of 50 mm/min to measure the tensile strength and the surface elongation at break. The measured values are listed in the following Table 2.

In this case, the surface elongation at break of the specimen was measured at a point of time at which at least one of the base layer and the hard coating layer was broken. Here, the hard coating layer was broken earlier than the base layer.

3. Evaluation of Folding Characteristics of Hard Coating Film

Each of the hard coating films after the weather resistance test was cut into pieces with a size of 100 mm×200 mm, thereby preparing specimens.

The prepared specimens were fixed with an adhesive according to the IEC 62715-6-1 using a folding tester (GS Yuasa Corp.). A folding radius of each the specimens was set to 5 mmR, and an in-folding test was repeatedly performed 50,000 times at a rate of 60 cycles/min. When the test was completed, the number of microcracks at a folded portion of each the specimens was checked using a microscope.

TABLE 2

| Items | Base layer | Composition for forming hard coating layer | Pencil hardness of hard coating layer | Before weather resistance test Tensile strength (MPa) | Before weather resistance test Surface elongation at break (%) | After weather resistance test Weather-resistant tensile strength (MPa) | After weather resistance test Weather-resistant Surface elongation at break (%) | B | B/A | Folding characteristics |
|---|---|---|---|---|---|---|---|---|---|---|
| Example 1 | Prep. Example 1 | Prep. Example 2 | 7 H | 231 | 16 | 217 | 14 | 0.13 | 2.1 | 0 |
| Example 2 | Prep. Example 1 | Prep. Example 3 | 7 H | 292 | 28 | 269 | 25 | 0.11 | 1.4 | 0 |
| Example 3 | Prep. Example 1 | Prep. Example 4 | 6 H | 238 | 15 | 218 | 14.5 | 0.03 | 0.3 | 0 |
| Example 4 | Prep. Example 1 | Prep. Example 5 | 7 H | 277 | 20 | 267 | 17 | 0.15 | 4.2 | 0 |
| Example 5 | Prep. Example 1 | Prep. Example 6 | 6 H | 250 | 16 | 230 | 11 | 0.31 | 6.3 | 4 |
| Example 6 | Prep. Example 1 | Prep. Example 7 | 6 H | 220 | 12 | 200 | 9 | 0.25 | 2.75 | 2 |
| Example 7 | Prep. Example 1 | Prep. Example 8 | 6 H | 280 | 35 | 255 | 40 | 0.14 | 1.57 | 4 |
| Example 8 | Prep. Example 1 | Prep. Example 11 | 4 H | 148 | 20 | 170 | 8 | 0.60 | 4.04 | 8 |
| Example 9 | Prep. Example 1 | Prep. Example 16 | 4 H | 120 | 25 | 140 | 40 | 0.6 | 3.6 | 4 |
| Example 10 | PET film | Prep. Example 5 | 4 H | 270 | 15 | 254 | 18 | 0.2 | 3.39 | 3 |
| Example 11 | PET film | Prep. Example 8 | 4 H | 225 | 21 | 189 | 32 | 0.52 | 3.25 | 6 |
| Comp. Example 1 | Prep. Example 1 | Prep. Example 9 | 5 H | 320 | 8 | 280 | 2 | 0.75 | 6.0 | 25 |
| Comp. Example 2 | Prep. Example 1 | Prep. Example 10 | 3 H | 187 | 20 | 177 | 6 | 0.70 | 13.2 | 19 |
| Comp. Example 3 | PET film | Prep. Example 13 | 2 H | 210 | 8 | 200 | 7 | 0.13 | 2.6 | 18 |
| Comp. Example 4 | Prep. Example 1 | Prep. Example 12 | 3 H | 150 | 4 | 140 | 1 | 0.75 | 11.2 | 27 |
| Comp. Example 5 | Prep. Example 1 | Prep. Example 13 | 2 H | 130 | 3 | 115 | 1 | 0.67 | 5.8 | 28 |
| Comp. Example 6 | Prep. Example 1 | Prep. Example 14 | 3 H | 167 | 4 | 84 | 4.2 | 0.05 | 0.1 | 24 |
| Comp. Example 7 | Prep. Example 1 | Prep. Example 15 | 1 H | 87 | 55 | 78 | 49 | 0.11 | 1.91 | 16 |

Referring to Table 2, it can be seen that the hard coating layers had a pencil hardness of 4H or higher, and the hard coating films of Examples, which had a surface elongation at break ranging from 10% to 50%, had improved folding characteristics, compared to those of Comparative Examples.

4. Change in Physical Properties According to Thicknesses of Base Layer and Hard Coating Layer Hard coating films were prepared in the same manner as in Example 3, except that the thickness of the base layer and the thickness of the hard coating layer were adjusted as listed in the following Table 3. The pencil hardness of the hard coating layer was measured to be 6H.

The tensile strength, the weather-resistant tensile strength, the surface elongation at break, the weather-resistant surface elongation at break, and the folding characteristics were measured using the evaluation method as described above. The results are listed in the following Table 3.

TABLE 3

| Items | Thickness of base layer (μm) | Thickness of hard coating layer (μm) | Thickness of base layer: thickness of hard coating layer | Before weather resistance test Tensile strength (MPa) | Before weather resistance test Surface elongation at break (%) | After weather resistance test Weather-resistant tensile strength (MPa) | After weather resistance test Weather-resistant Surface elongation at break (%) | Folding characteristics |
|---|---|---|---|---|---|---|---|---|
| Example 3 | 80 | 10 | 1:0.125 | 238 | 15 | 218 | 14.5 | 0 |
| Example 12 | 80 | 4.8 | 1:0.06 | 302 | 25 | 289 | 21 | 0 |
| Example 13 | 80 | 24 | 1:0.3 | 205 | 12 | 190 | 11 | 0 |
| Example 14 | 80 | 48 | 1:0.6 | 169 | 10 | 159 | 10 | 0 |

TABLE 3-continued

| Items | Thickness of base layer (μm) | Thickness of hard coating layer (μm) | Thickness of base layer: thickness of hard coating layer | Before weather resistance test Tensile strength (MPa) | Before weather resistance test Surface elongation at break (%) | After weather resistance test Weather-resistant tensile strength (MPa) | After weather resistance test Weather-resistant Surface elongation at break (%) | Folding characteristics |
|---|---|---|---|---|---|---|---|---|
| Example 15 | 80 | 0.8 | 1:0.01 | 320 | 29 | 312 | 25 | 8 |
| Comp. Example 8 | 80 | 64 | 1:0.8 | 152 | 5 | 123 | 4 | 23 |

Referring to Table 3, it can be seen that the folding characteristics were improved when the thicknesses of the base layer and the hard coating layer satisfied the predetermined thickness ratio.

The hard coating film according to the exemplary embodiments of the present invention has the hard coating layer, which has a pencil hardness of 4H or higher, disposed on the base layer, and has a surface elongation at break of 10% to 50%, as measured by a certain method. Due to such a configuration as described above, the overall mechanical strength and flexibility of the hard coating film can be improved together. Therefore, the hard coating layer can be restored to an original state without permanent deformation and/or damage even when the hard coating layer is repeatedly modified a predetermined number of times.

According to some embodiments, because the hard coating film satisfies a certain equation after a predetermined weather resistance test, no microcracks occur even after repeated folding. Accordingly, the durability and long-term life expectancy of the flexible display device can be ensured. Also, the physical and chemical stability under high-temperature/high-humidity conditions can also be ensured.

According to the exemplary embodiments, the flexibility and mechanical strength of the hard coating film can be further improved by adjusting the thicknesses of the base layer and the hard coating layer to satisfy a predetermined thickness ratio.

According to exemplary embodiments, the base layer can be formed of a polyamide imide-based resin to ensure excellent optical and mechanical characteristics (for example, elastic modulus).

According to the exemplary embodiments, the hard coating layer may be formed of the epoxysilane-based resin. Therefore, the mechanical strength of the hard coating film can be improved.

DETAILED DESCRIPTION OF MAIN ELEMENTS

10: hard coating film
100: base layer
110: hard coating layer

What is claimed is:

1. A hard coating film comprising:
a base layer including a polyamide imide-based resin containing a fluorine atom and an aliphatic ring; and
a hard coating layer disposed on at least one surface of the base layer and having a pencil hardness of 4H or higher,
wherein a surface elongation at break of the hard coating film is in a range of 10% to 50%,
wherein the surface elongation at break represents an elongation at a point of time at which any one of the base layer and the hard coating layer is broken beforehand when the hard coating film is set so that a length of the hard coating film to which a tensile force is applied in a tensile strength tester is 50 mm, and then elongated at a rate of 50 mm/min,
wherein the hard coating film has a weather-resistant surface elongation at break of 5% to 50%, and the weather-resistant surface elongation at break represents a surface elongation at break measured after the hard coating film is kept for 250 hours under conditions of 60° C. and 90% relative humidity,
wherein the hard coating film satisfies the following Equation 1:

$$0.2 \leq B/A \leq 7,  \quad \text{[Equation 1]}$$

wherein A is represented by the following Equation 2, and B is represented by the following Equation 3, where the weather-resistant tensile strength in Equation 2 represents a tensile strength measured after the hard coating film is kept for 250 hours under conditions of 60° C. and 90% relative humidity, and the weather-resistant surface elongation at break in Equation 3 represents a surface elongation at break measured after the hard coating film is kept for 250 hours under conditions of 60° C. and 90% relative humidity $$A = \frac{|\text{Weather-Resistant Tensile Strength} - \text{Tensile Strength}|}{\text{Tensile Strength}} \quad \text{[Equation 2]}$$

$$B = \frac{|\text{Weather-Resistant Surface Elongation at Break} - \text{Surface Elongation at Break}|}{\text{Surface Elongation at Break}} \quad \text{[Equation 3]}$$

wherein B in Equation 1 is less than or equal to 0.6,
wherein the base layer has a tensile modulus of 3 GPa to 8 GPa, and
wherein a thickness ratio of the base layer and the hard coating layer is in a range of 1:0.06 to 1:0.6.

2. The hard coating film of claim 1, wherein the surface elongation at break is in a range of 15% to 30%.

3. The hard coating film of claim 1, wherein the weather-resistant surface elongation at break is in a range of 10% to 30%.

4. The hard coating film of claim 1, wherein the hard coating film further comprises a plurality of base layers and/or a plurality of hard coating layers.

5. The hard coating film of claim 1, further comprising an antifouling layer, an antistatic layer, or an antireflective layer disposed on at least one surface of the base layer or the hard coating layer.

6. The hard coating film of claim 1, wherein the hard coating layer includes an epoxysilane-based resin.

7. A flexible display panel comprising the hard coating film of claim 1.

8. The hard coating film of claim 1, wherein the hard coating layer is formed from a composition comprising an epoxy siloxane-based resin and a crosslinking agent.

9. The hard coating film of claim 1, wherein the hard coating layer comprises ethylene oxide-modified pentaerythritol tetraacrylate or urethane-modified acrylate.

10. The hard coating film of claim 1, wherein the polyamide imide-based resin is a copolymer of (a) a fluorine-based aromatic diamine, (b1) a dianhydride having an aromatic ring, (b2) a dianhydride having an aliphatic ring and (c) an aromatic dicarboxylic acid or a derivative thereof, and the dianhydride having an aromatic ring and the dianhydride having an aliphatic ring are at a molar ratio of 1:1.

11. The hard coating film of claim 1, wherein the polyamide imide-based resin is a block-type polyamide imide-based resin.

* * * * *